(12) United States Patent
Wang et al.

(10) Patent No.: US 12,236,697 B2
(45) Date of Patent: Feb. 25, 2025

(54) METHOD OF IDENTIFYING CHARACTERS IN IMAGES, ELECTRONIC DEVICE, AND STORAGE MEDIUM

(71) Applicant: HON HAI PRECISION INDUSTRY CO., LTD., New Taipei (TW)

(72) Inventors: Cheng-Feng Wang, Kaohsiung (TW); Li-Che Lin, Kaohsiung (TW); Hui-Xian Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 395 days.

(21) Appl. No.: 17/747,136

(22) Filed: May 18, 2022

(65) Prior Publication Data

US 2023/0023611 A1    Jan. 26, 2023

(30) Foreign Application Priority Data

Jul. 22, 2021 (CN) .......................... 202110833297.X

(51) Int. Cl.
*G06V 30/12* (2022.01)
*G06T 5/70* (2024.01)
*G06V 30/148* (2022.01)
*G06V 30/18* (2022.01)

(52) U.S. Cl.
CPC ............ *G06V 30/1801* (2022.01); *G06T 5/70* (2024.01); *G06V 30/12* (2022.01); *G06V 30/15* (2022.01)

(58) Field of Classification Search
CPC .... G06V 30/1801; G06V 30/12; G06V 30/15; G06V 30/10; G06V 30/164; G06V 30/18; G06V 30/18105; G06V 30/19013; G06V 30/414; G06T 5/00; G06T 5/70; G06T 2207/20024; G06T 2207/20028; G06T 2207/20036
See application file for complete search history.

(56) References Cited

U.S. PATENT DOCUMENTS

| | | | |
|---|---|---|---|
| 11,704,922 B2* | 7/2023 | Kakrana | G06V 30/416 382/176 |
| 2015/0169972 A1* | 6/2015 | Vu | G06V 30/15 382/182 |

FOREIGN PATENT DOCUMENTS

| | | |
|---|---|---|
| CN | 107609558 | 1/2018 |
| CN | 112949471 | 6/2021 |

\* cited by examiner

*Primary Examiner* — Sumati Lefkowitz
*Assistant Examiner* — Michael Adam Shariff
(74) *Attorney, Agent, or Firm* — ScienBiziP, P.C.

(57) ABSTRACT

A method of identifying characters in images extracts features of a detection image including characters. Enhancement processing is performed on the detection image according to the features to obtain an enhanced image. Closed edges of the characters are detected in the enhanced image. First rectangular outlines of the characters are determined according to the closed edges. The first rectangular outlines are corrected to obtain second rectangular outlines. The characters are cropped from the detection image according to the second rectangular outlines. The method identifies characters in images accurately and rapidly.

17 Claims, 9 Drawing Sheets

METHOD OF IDENTIFYING CHARACTERS IN IMAGES, ELECTRONIC DEVICE, AND STORAGE MEDIUM

FIELD

The subject matter herein generally relates to image processing, specifically a method of identifying characters in images, an electronic device, and a storage medium.

BACKGROUND

To identify characters in images, it is required to split and isolate characters one by one. Such identification is often performed in processing images of license plate, and identity card. A neural network model can identify characters in an image. However, a large amount of training data is used to train the neural network model, and there are certain requirements for the characters in the image. When the characters do not meet the requirements, for example, the individual characters are not sufficiently clear, the characters cannot be accurately identified.

DETAILED DESCRIPTION

For clarity of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Figure 1:
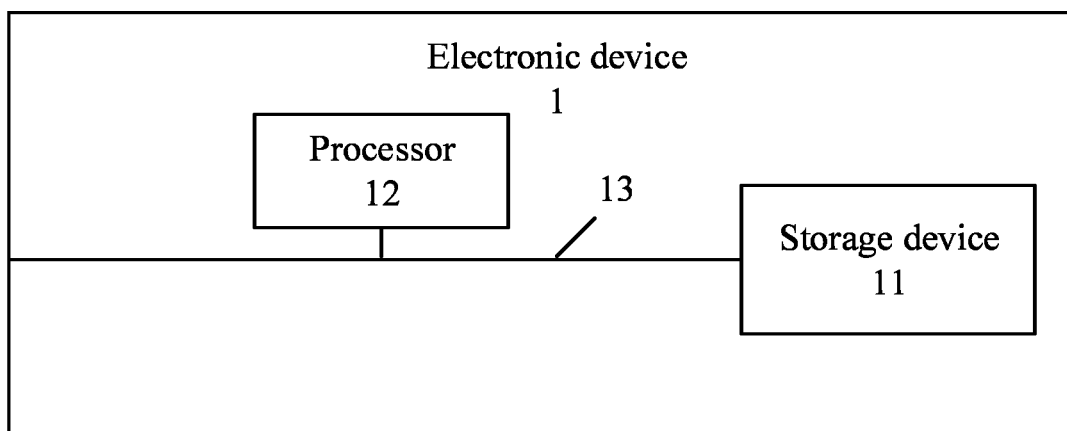
FIG. 1 is a block diagram of an electronic device implementing a method of identifying characters in images in one embodiment of the present disclosure.

FIG. 1 is a block diagram of an electronic device implementing a method of identifying characters in images in one embodiment of the present disclosure. The electronic device 1 includes, but is not limited to, a storage device 11, at least one processor 12, and a communication bus 13. The storage device 11 and at least one processor 12 are connected via the communication bus 13 or connected directly.

The electronic device 1 can be any electronic product that can interact with a user, such as a personal computer, a tablet computer, a smart phone, a personal digital assistant (PDA), a smart wearable device, etc. Those skilled in the art will understand that electronic device 1 is only an example, and does not constitute a limitation. Other examples of electronic device 1 may include more or fewer components than shown in FIG. 1, or combine some components, or have different components. For example, the electronic device 1 may further include an input/output device, a network access device, and the like.

Figure 2:
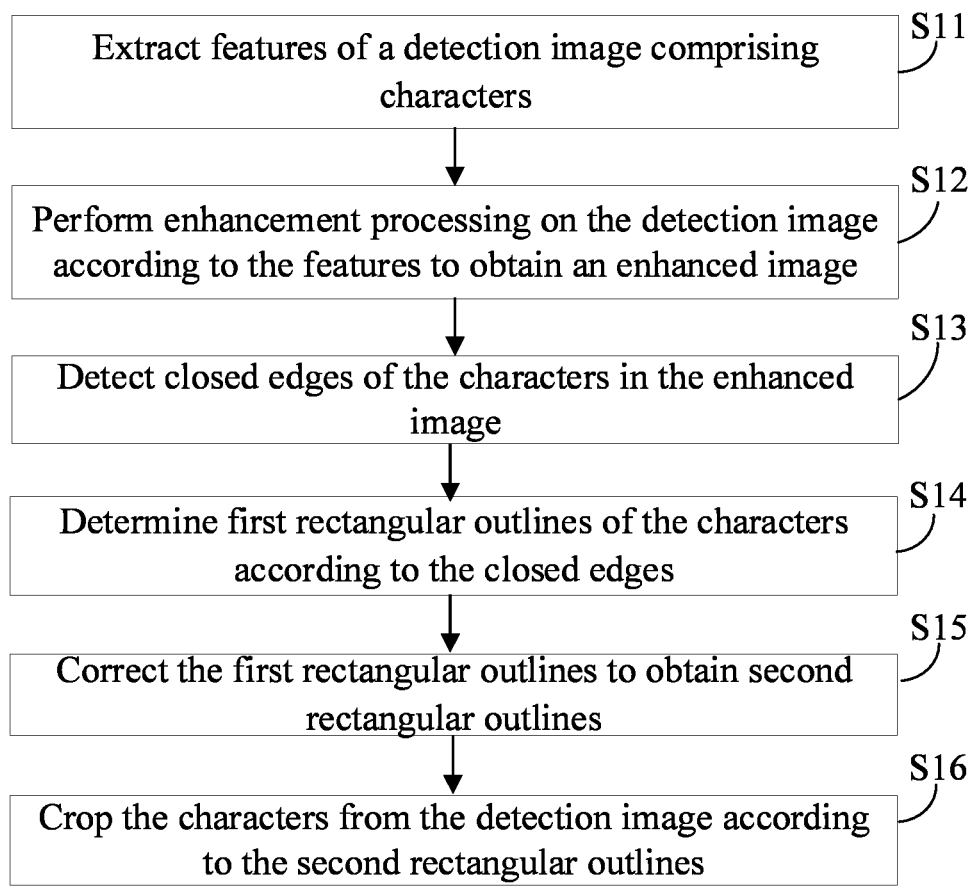
FIG. 2 is a flowchart of the method in one embodiment of the present disclosure.

FIG. 2 is a flowchart of a method of identifying characters in images in one embodiment. The method can isolating characters in images, for identification purposes, accurately and rapidly. The method may be executed by an electronic device (e.g., electronic device 1 in FIG. 1). According to different requirements, the order of the blocks in the flowchart may be changed, and some blocks may be omitted.

In block S11, the electronic device extracts features of an image ("detection image") in which characters are to be recognized and classified.

Figure 3:
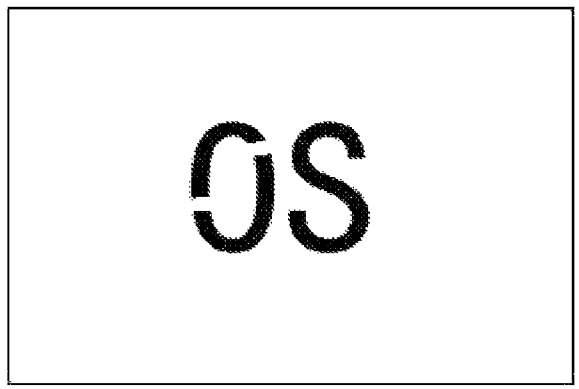
FIG. 3 shows characters to be identified in an image.

The detection image is an image including characters which are to be recognized and classified. Each character in the detection image can be perfectly portrayed or broken. FIG. 3 shows characters in a detection image. In FIG. 3, the "O" is broken and the "S" is perfectly portrayed.

In one embodiment, the detection image can be a black and white image. For example, the characters in the detection image are white, and background in the detection image is black. The electronic device can calculates an average pixel value, a standard deviation, a length, and a width of the detection image as the features of the detection image.

In another embodiment, the detection image can be a color image. The electronic device can perform binarization on the detection image to obtain a binarized image, and calculate an average pixel value, a standard deviation, a length, and a width of the detection image of the binarized image as the features of the detection image.

In block S12, the electronic device performs enhancement processing on the detection image according to the features to obtain an enhanced image.

Enhancement processing can improve an effect of identifying characters in the detection image.

In one embodiment, the electronic device compares the average pixel value with a first threshold to obtain a comparison result, and reverses colors of the detection image according to the comparison result to obtain a reversed image. The electronic device can apply a denoising algorithm to match the standard deviation, determine kernel parameters of the denoising algorithm according to the length and the width of the detection image, and denoise the reversed image using the denoising algorithm to obtain the enhanced image.

The comparison result indicates whether the characters in the detection image are white, and the background in the detection image is black. If the characters in the detection image are white, and the background in the detection image is black, the electronic device reverses the colors of the detection image to obtain the reversed image. In the reversed image, the characters are black, and the background is white.

The first threshold can be preset. The electronic device determines whether the average pixel value is greater than the first threshold. If the average pixel value is greater than the first threshold, indicating that the characters in the detection image are black, and the background in the detection image is white, the electronic device does not reverse the colors of the detection image. If the average pixel value is less than the first threshold, indicating that the characters in the detection image are white, and the background in the detection image is black, the electronic device reverses the colors of the detection image.

The electronic device can determine whether the reversed detection image has a lot of noise in the detection image according to the standard deviation, and accordingly determine the denoising algorithm.

The second threshold can be preset. The electronic device can determine whether the standard deviation is greater than the second threshold. If the standard deviation is greater than the second threshold, indicating that the detection image has a lot of noise, a Gaussian filter can be used as the denoising algorithm. If the standard deviation is less than the second threshold, indicating that the detection image has less noise, a bilateral filter can be used as the denoising algorithm.

The electronic device can determine the kernel parameters of the denoising algorithm according to the length and the width of the detection image, and denoise the reversed image using the denoising algorithm to obtain the enhanced image. For example, a detection image with a size of 1102 (pixels)*1102 (pixels) is obtained. The average pixel value is 48.97 and the standard deviation is 28.01. The first threshold is 128 and the second threshold is 31. The average pixel value of 48.97 is less than the first threshold of 128, indicating that the characters in the detection image are white, and the background in the detection image is black, thus the electronic device reverses the colors of the detection image. The standard deviation of 28.01 is less than the second threshold value of 31, indicating that the detection image has less noise, thus the electronic device can use the bilateral filter to denoise the reversed image. The size of the detection image is between 1000 and 2000, and the kernel parameters of the denoising algorithm can be 13*13.

By enhancing the detection image according to the features of the detection image, the characters can be identified more accurately.

In block S13, the electronic device detects closed edges of the characters in the enhanced image. Each close edge is an edge which is closed.

Figure 4:
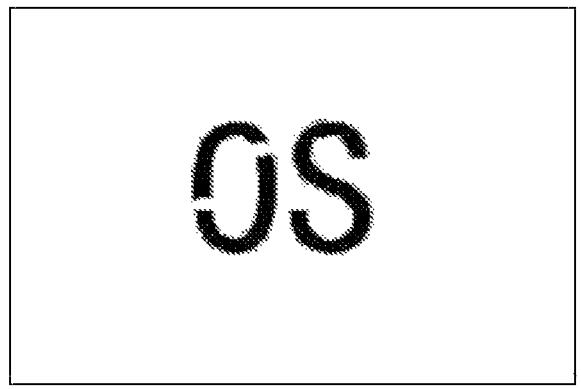
FIG. 4 shows closed edges detected in an enhanced image based on the image of FIG. 3.

In order to extract outlines of the characters, closed edges of the characters needs to be extracted. For a broken character, more than one closed edge can be detected. FIG. 4 shows closed edges detected in an enhanced image based on the detection image of FIG. 3.

An edge detection algorithm can be used to detect the closed edges of the characters in the enhanced image. In one embodiment, the electronic device performs morphological processing (e.g., erosion and expansion) on the enhanced image to obtain a morphological image. The electronic device performs edge detection on the morphological image to obtain an edge image, and extracts the closed edges in the edge image.

By performing morphological processing on the enhanced image, the characters and the background in the enhanced image are more easily separated, and the closed edges can be detected more easily and accurately.

In block S14, the electronic device determines first rectangular outlines of the characters according to the closed edges.

In one embodiment, the electronic device generates a raw image with a size which is same as the detection image. The raw image is initially a blank image.

Figure 5:
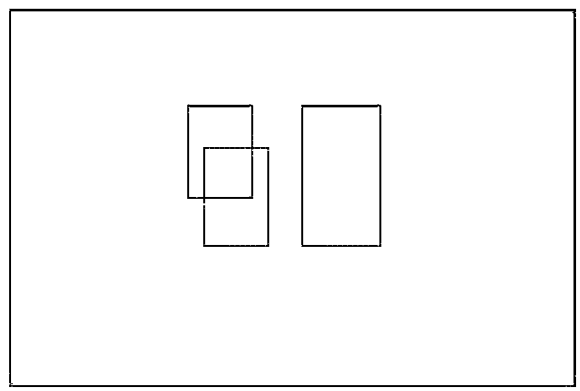
FIG. 5 shows bounding boxes in a raw image.

The electronic device generates bounding boxes in the raw image according to the closed edges. Each bounding box is a rectangular region in the raw image. Each bounding box corresponds to a closed edge, and a position of the bounding box in the raw image is same as a position of the closed edge in the detection image. The electronic device can determine coordinates of the closed edge in the detection image, and generate the bounding box in the raw image according to the coordinates of the closed edge. FIG. 5 shows bounding boxes in a raw image.

Figure 6:
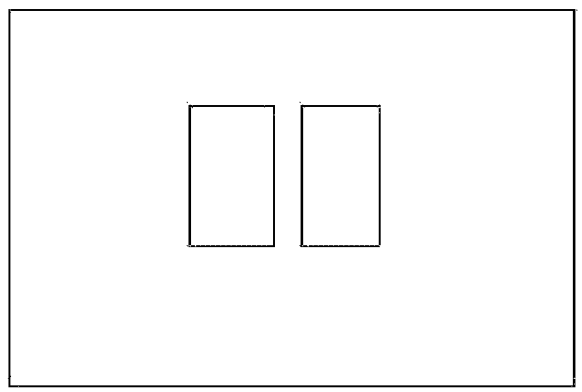
FIG. 6 shows bounding boxes which are merged in the raw image.

If two or more bounding boxes in the raw image overlap, the electronic device merges the two or more bounding boxes into a merged bounding box. For example, a character may be broken into two parts, two closed edges of the character are detected, and two bounding boxes are generated. If the two bounding boxes overlap, the electronic device merges the two bounding boxes. FIG. 6 shows bounding boxes which are merged in the raw image.

The electronic device sets remaining bounding boxes in the raw image as the first rectangular outlines. The remaining bounding boxes include bounding boxes that do not overlap and bounding boxes which are merged.

In block S15, the electronic device corrects the first rectangular outlines to obtain second rectangular outlines. Each second rectangular outline corresponds to a character in the detection image.

In one embodiment, the electronic device calculates an average area, an average horizontal spacing, and an average vertical spacing of the first rectangular outlines, and corrects the first rectangular outlines according to the average area, the average horizontal spacing, and the average vertical spacing to obtain the second rectangular outlines.

The electronic device may establish a coordinate system ("XOY"), determine coordinates of vertices of the first rectangular outlines in the coordinate system, calculate widths and lengths of the first rectangular outlines according to the coordinates of vertices, and calculate the average area according to the widths and the lengths. Each first rectangular outline corresponds to a width and a length. An origin (O) of the coordinate system can be a lower left corner of the enhanced image when the enhanced image is placed in a forward direction. An X-axis of the coordinate system can be a horizontal direction of the enhanced image. A Y-axis of the coordinate system can be a vertical direction of the enhanced image.

According to the coordinates of vertices, the electronic device determines every pair of the first rectangular outlines that are horizontally adjacent, and calculates the average horizontal spacing according to the two of the first rectangular outlines that are horizontally adjacent. According to the coordinates of vertices, the electronic device further determines every pair of the first rectangular outlines that are vertically adjacent, and calculates the average vertical spacing according to the two of first rectangular outlines that are vertically adjacent.

Figure 7:
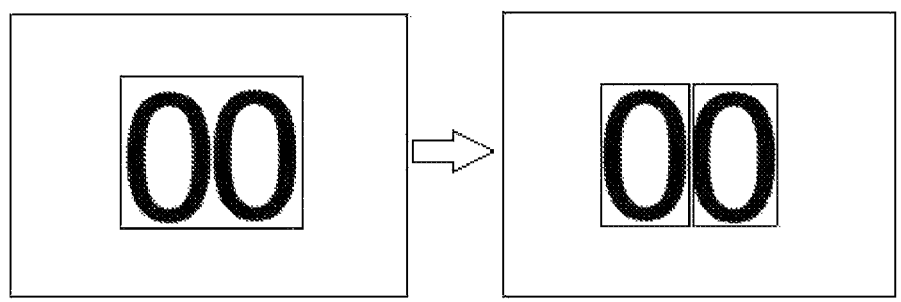
FIG. 7 shows divisions of a candidate rectangle outline.

In one embodiment, the electronic device calculates a horizontal spacing between each pair of the first rectangular outlines that are horizontally adjacent, and calculates a vertical spacing between each pair of the first rectangular outlines that are vertically adjacent. The electronic device merges the first rectangular outlines according to the horizontal spacing and the vertical spacing to obtain candidate rectangular outlines. If a ratio of an area of a candidate rectangular outline to the average area is smaller than a first ratio, the electronic device removes a candidate rectangular outline from the candidate rectangular outlines. If the ratio is larger than a second ratio, the electronic device divides the candidate rectangle outline. FIG. 7 shows dividing of a candidate rectangle outline. In one embodiment, the first ratio is 1 and the second ratio is 2.

In one embodiment, the electronic device may obtain the candidate rectangular outlines as follows (S501-S506).

S501, the electronic device obtains each two first rectangular outlines A that are horizontally adjacent and which have a horizontally adjacent spacing which is smaller than the average horizontal spacing.

S502, the electronic device merges the two first rectangular outlines A according to coordinates of vertices of the rectangular outlines A to obtain rectangular outlines B.

S503, the electronic device obtains rectangular outlines C from the rectangular outlines B which have a vertically adjacent spacing which is smaller than the average vertical spacing.

S504, the electronic device merges the rectangular outlines C according to coordinates of vertices of the rectangular outlines C to obtain rectangular outlines D.

S505, the electronic device calculates a horizontally adjacent spacing and a vertically adjacent spacing between two rectangular outlines D.

S506, when the horizontally adjacent spacing is greater than the average horizontal spacing and the adjacent vertical spacing is greater than the average vertical spacing, the process ends.

Figure 8:
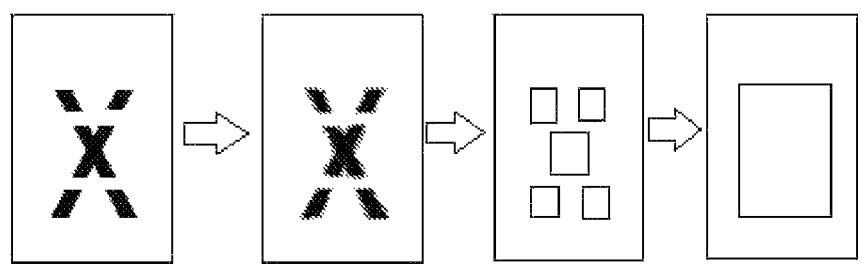
FIG. 8 shows correction of first rectangular outlines.

FIG. 8 shows correcting of first rectangular outlines. As shown in FIG. 8, "X" is broken into five parts, and five first rectangular outlines are obtained. The five first rectangular outlines are corrected to a new rectangular outline.

By correcting the first rectangular outlines, the accuracy of character identifying is improved.

In block S16, the electronic device crops the characters from the detection image according to the second rectangular outlines.

Each second rectangular outline corresponds to a complete character. Therefore, the characters can be cropped from the detection image according to the second rectangular outlines.

Figure 9:
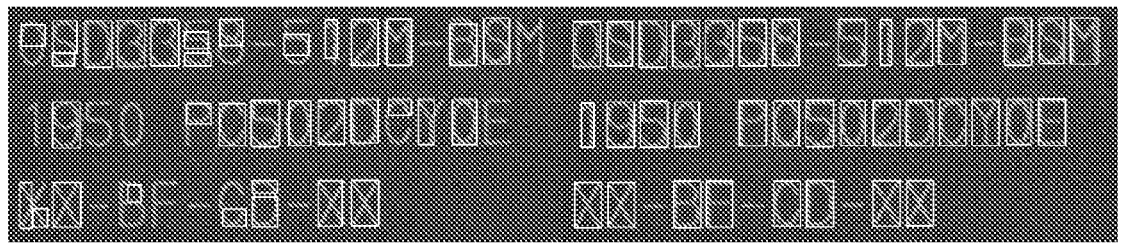
FIG. 9 shows results of character identification.

FIG. 9 shows results of character identification. On the left is the result using a neural network model, and on the right is the result using the method of the present disclosure.

In FIG. 1, a computer program may be stored in the storage device 11 and executable by the processor 12. The processor 12 may execute the computer program to implement the blocks in the method described above, such as the blocks S11 to S16 in FIG. 1.

The storage device 11 may be an internal memory of the electronic device 1, that is, a memory built into the electronic device 1. The storage device 11 may also be an external memory of the electronic device 1, that is, a memory externally connected to the electronic device 1.

The storage device 11 is used for storing program codes and various data, and accesses programs and data during the operation of the electronic device 1.

The storage device 11 may include a storage program area and a storage data area. The storage program area may store an operating system, and programs required by at least one function, etc.; the storage data area may store data and the like created in the use of the electronic device 1. In addition, the storage device 11 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 12 may be a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 12 may be a microprocessor or any conventional processor. The processor 12 may be a control center of the electronic device 1, and connect various parts of the entire electronic device 1 by using various interfaces and lines.

In an exemplary embodiment, the computer program may be divided into one or more modules, and the one or more modules are stored in the storage device 11 and executed by the processor 12 to complete the method of the present disclosure. The one or more modules can be a series of computer-readable instruction segments capable of performing specific functions, and the instruction segments are used to describe execution processes of the computer program in the electronic device 1.

When the modules integrated in the electronic device 1 are implemented in the form of software functional units and used as independent units, they can be stored in a non-transitory readable storage medium. According to this understanding, all or part of the processes in the method of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the electronic device 1 may also include a power source (such as a battery) for supplying power to various components. The power source may be logically connected to the at least one processor 12 through a power management device, so as to realize functions such as charging, discharging, and power consumption management. The power supply may also include direct current or alternating current power supplies, recharging devices, power failure detection circuits, power converters or inverters, and power status indicators. The electronic device 1 may also include various sensors, BLUETOOTH modules, WI-FI modules, etc.

In several embodiments provided in the preset disclosure, it should be understood that the disclosed electronic device and method may be implemented in other ways. For example, the embodiments of the electronic device described above are merely illustrative. For example, the units are only divided according to logical function, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the method.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable an electronic device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A method of identifying characters in images, comprising:
   extracting features of an image;
   performing enhancement processing on the image according to the extracted features to obtain an enhanced image;
   detecting closed edges of characters in the enhanced image;
   determining first rectangular outlines of the characters in the enhanced image according to the detected closed edges;
   correcting the first rectangular outlines to obtain second rectangular outlines, comprising: calculating an average area of the first rectangular outlines, an average horizontal spacing of the first rectangular outlines, and an average vertical spacing of the first rectangular outlines; correcting the first rectangular outlines according to the average area, the average horizontal spacing, and the average vertical spacing to obtain the second rectangular outlines; and
   cropping characters from the image according to the second rectangular outlines.

2. The method of claim 1, wherein the features being extracted from the image comprises: an average pixel value, a standard deviation, a length of the image, and a width of the image, and performing enhancement processing on the image according to the extracted features to obtain an enhanced image comprises:
   comparing the average pixel value with a first threshold to obtain a comparison result, and reversing colors of the image according to the comparison result to obtain a reversed image;
   determining a denoising algorithm matching the standard deviation; and
   determining kernel parameters of the denoising algorithm according to the length of the image, and the width of the image, and denoising the reversed image using the denoising algorithm to obtain an enhanced image.

3. The method of claim 1, wherein determining first rectangular outlines of the characters in the enhanced image according to the closed edges comprises:
   generating a raw image with a size same as the image;
   generating bounding boxes in the raw image according to the detected closed edges to obtain outline images, each of the bounding boxes corresponding to a corresponding one of the detected closed edges;
   merging the bounding boxes which overlap in the raw image; and
   setting remaining of the bounding boxes as the first rectangular outlines.

4. The method of claim 1, wherein calculating an average area, an average horizontal spacing, and an average vertical spacing of the first rectangular outlines comprises:
   determining coordinates of vertices of the first rectangular outlines;
   calculating widths and lengths of the first rectangular outlines according to the coordinates;
   calculating the average area according to the widths and the lengths;
   determining each pair of the first rectangular outlines that are horizontally adjacent according to the coordinates;
   calculating the average horizontal spacing from the pairs of the first rectangular outlines which are determined to be horizontally adjacent;
   determining each pair of the first rectangular outlines that are vertically adjacent according to the coordinates; and
   calculating the average vertical spacing form the pairs of first rectangular outlines which are determined to be vertically adjacent.

5. The method of claim 4, wherein correcting the first rectangular outlines according to the average area, the average horizontal spacing, and the average vertical spacing to obtain the second rectangular outlines comprises:
   calculating a horizontal spacing between each pair of the first rectangular outlines that are horizontally adjacent, and calculating a vertical spacing between each pair of the first rectangular outlines that are vertically adjacent;
   merging the first rectangular outlines according to the horizontal spacing and the vertical spacing to obtain candidate rectangular outlines;
   removing a candidate rectangular outline from the candidate rectangular outlines if a ratio of an area of the candidate rectangular outline to the average area is smaller than a first ratio; and
   dividing the candidate rectangle outline if the ratio is larger than a second ratio.

6. The method of claim 5, wherein merging the first rectangular outlines according to the horizontal spacing and the vertical spacing to obtain candidate rectangular outlines comprises:
   merging the pair of the first rectangular outlines if the horizontal spacing is smaller than the average horizontal spacing; and
   merging the pair of the first rectangular outlines if the vertical spacing is smaller than the average vertical spacing.

7. The method of claim 1, wherein detecting closed edges of the characters in the enhanced image comprises:
   performing binarization on the enhanced image to obtain a binarized image;
   performing morphological processing on the binarized image to obtain a morphological image;

performing edge detection on the morphological image to obtain an edge image; and extracting edges in the edge image.

8. An electronic device comprising:

at least one processor; and a storage device storing computer-readable instructions, which when executed by the at least one processor, cause the at least one processor to:

extract features of a detection image comprising characters;

perform enhancement processing on the detection image according to the features to obtain an enhanced image;

detect closed edges of the characters in the enhanced image;

determine first rectangular outlines of the characters according to the closed edges;

correct the first rectangular outlines to obtain second rectangular outlines by calculating an average area, an average horizontal spacing, and an average vertical spacing of the first rectangular outlines and correcting the first rectangular outlines according to the average area, the average horizontal spacing, and the average vertical spacing to obtain the second rectangular outlines; and crop the characters from the detection image according to the second rectangular outlines.

9. The electronic device of claim 8, wherein the features comprises: an average pixel value, a standard deviation, a length, and a width of the detection image, and the at least one processor is further caused to:

compare the average pixel value with a first threshold to obtain a comparison result, and reverse colors of the detection image according to the comparison result to obtain a reversed image;

determine a denoising algorithm matching the standard deviation; and determine kernel parameters of the denoising algorithm according to the length and the width of the detection image, and denoise the reversed image using the denoising algorithm to obtain an enhanced image.

10. The electronic device of claim 8, wherein the at least one processor is further caused to:

generate a raw image with a size same as the detection image;

generate bounding boxes in the raw image according to the closed edges to obtain outline images, each of the bounding boxes corresponding to one of the closed edges;

merge bounding boxes that overlap in the raw image; and set remaining bounding boxes as the first rectangular outlines.

11. The electronic device of claim 8, wherein the at least one processor is further caused to:

determine coordinates of vertices of the first rectangular outlines;

calculate widths and lengths of the first rectangular outlines according to the coordinates;

calculate the average area according to the widths and the lengths;

determine every pair of the first rectangular outlines that are horizontally adjacent according to the coordinates;

calculate the average horizontal spacing according to the two of the first rectangular outlines that are horizontally adjacent;

determine every pair of the first rectangular outlines that are vertically adjacent according to the coordinates; and calculate the average vertical spacing according to the two of first rectangular outlines that are vertically adjacent.

12. The electronic device of claim 11, wherein the at least one processor is further caused to:

calculate a horizontal spacing between each pair of the first rectangular outlines that are horizontally adjacent, and calculate a vertical spacing between each pair of the first rectangular outlines that are vertically adjacent;

merge the first rectangular outlines according to the horizontal spacing and the vertical spacing to obtain candidate rectangular outlines; and remove a candidate rectangular outline from the candidate rectangular outlines when a ratio of an area of the candidate rectangular outline to the average area is smaller than a first ratio; and divide the candidate rectangle outline when the ratio is larger than a second ratio.

13. A non-transitory storage medium having stored thereon computer-readable instructions that, when the computer-readable instructions are executed by a processor to implement the following method:

extracting features of a detection image comprising characters;

performing enhancement processing on the detection image according to the features to obtain an enhanced image;

detecting closed edges of the characters in the enhanced image;

determining first rectangular outlines of the characters according to the closed edges;

correcting the first rectangular outlines to obtain second rectangular outlines, comprising: calculating an average area of the first rectangular outlines, an average horizontal spacing of the first rectangular outlines, and an average vertical spacing of the first rectangular outlines; correcting the first rectangular outlines according to the average area, the average horizontal spacing, and the average vertical spacing to obtain the second rectangular outlines; and cropping the characters from the detection image according to the second rectangular outlines.

14. The non-transitory storage medium of claim 13, wherein the features comprises: an average pixel value, a standard deviation, a length, and a width of the detection image, and performing enhancement processing on the detection image according to the features to obtain an enhanced image comprises:

comparing the average pixel value with a first threshold to obtain a comparison result, and reversing colors of the detection image according to the comparison result to obtain a reversed image;

determining a denoising algorithm matching the standard deviation; and determining kernel parameters of the denoising algorithm according to the length and the width of the detection image, and denoising the reversed image using the denoising algorithm to obtain an enhanced image.

15. The non-transitory storage medium of claim 13, wherein determining first rectangular outlines of the characters according to the closed edges comprises:

generating a raw image with a size same as the detection image;

generating bounding boxes in the raw image according to the closed edges to obtain outline images, each of the bounding boxes corresponding to one of the closed edges;

merging bounding boxes that overlap in the raw image; and setting remaining bounding boxes as the first rectangular outlines.

16. The non-transitory storage medium of claim 13, wherein calculating an average area, an average horizontal spacing, and an average vertical spacing of the first rectangular outlines comprises:
- determining coordinates of vertices of the first rectangular outlines;
- calculating widths and lengths of the first rectangular outlines according to the coordinates;
- calculating the average area according to the widths and the lengths;
- determining every pair of the first rectangular outlines that are horizontally adjacent according to the coordinates;
- calculating the average horizontal spacing according to the two of the first rectangular outlines that are horizontally adjacent;
- determining every pair of the first rectangular outlines that are vertically adjacent according to the coordinates; and
- calculating the average vertical spacing according to the two of first rectangular outlines that are vertically adjacent.

17. The non-transitory storage medium of claim 16, wherein correcting the first rectangular outlines according to the average area, the average horizontal spacing, and the average vertical spacing to obtain the second rectangular outlines comprises:
- calculating a horizontal spacing between each pair of the first rectangular outlines that are horizontally adjacent, and calculating a vertical spacing between each pair of the first rectangular outlines that are vertically adjacent;
- merging the first rectangular outlines according to the horizontal spacing and the vertical spacing to obtain candidate rectangular outlines; and
- removing a candidate rectangular outline from the candidate rectangular outlines when a ratio of an area of the candidate rectangular outline to the average area is smaller than a first ratio; and
- dividing the candidate rectangle outline when the ratio is larger than a second ratio.

\* \* \* \* \*